Sept. 26, 1967   J. A. RAKEL   3,343,648
CONVEYING MEANS AND METHOD
Filed Oct. 22, 1965   2 Sheets-Sheet 1
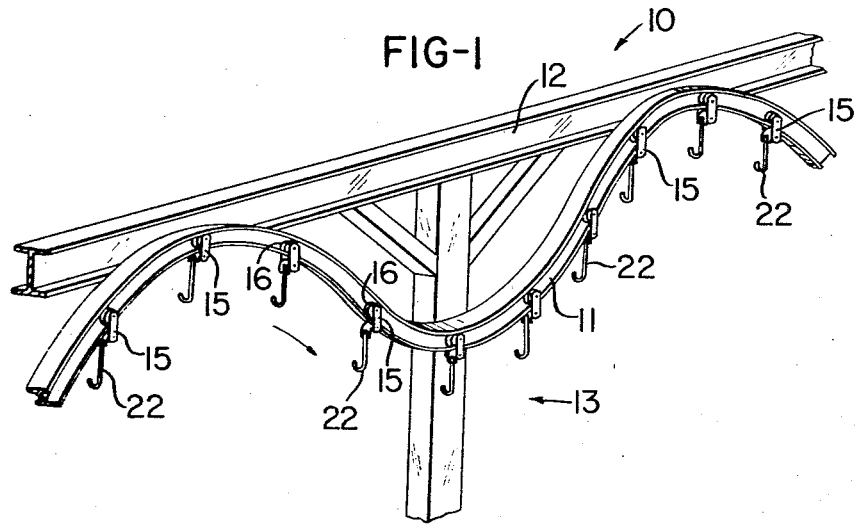
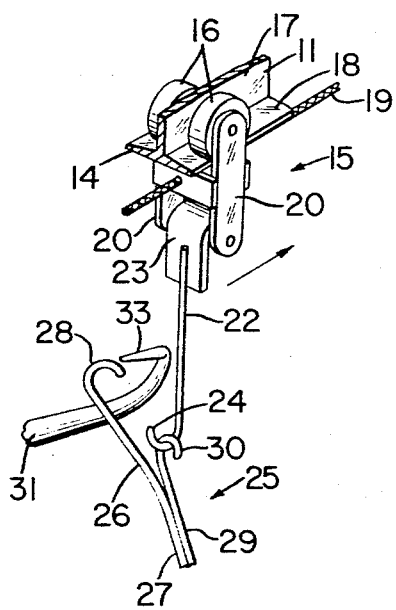 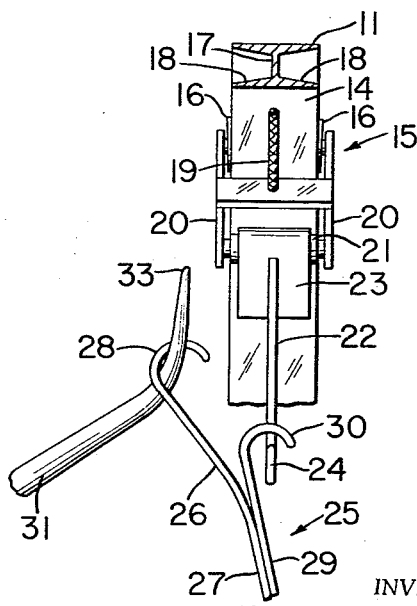
INVENTOR.
JAMES A. RAKEL
BY Kinney and Schenk
HIS ATTORNEYS Sept. 26, 1967  J. A. RAKEL  3,343,648
CONVEYING MEANS AND METHOD
Filed Oct. 22, 1965  2 Sheets-Sheet 2
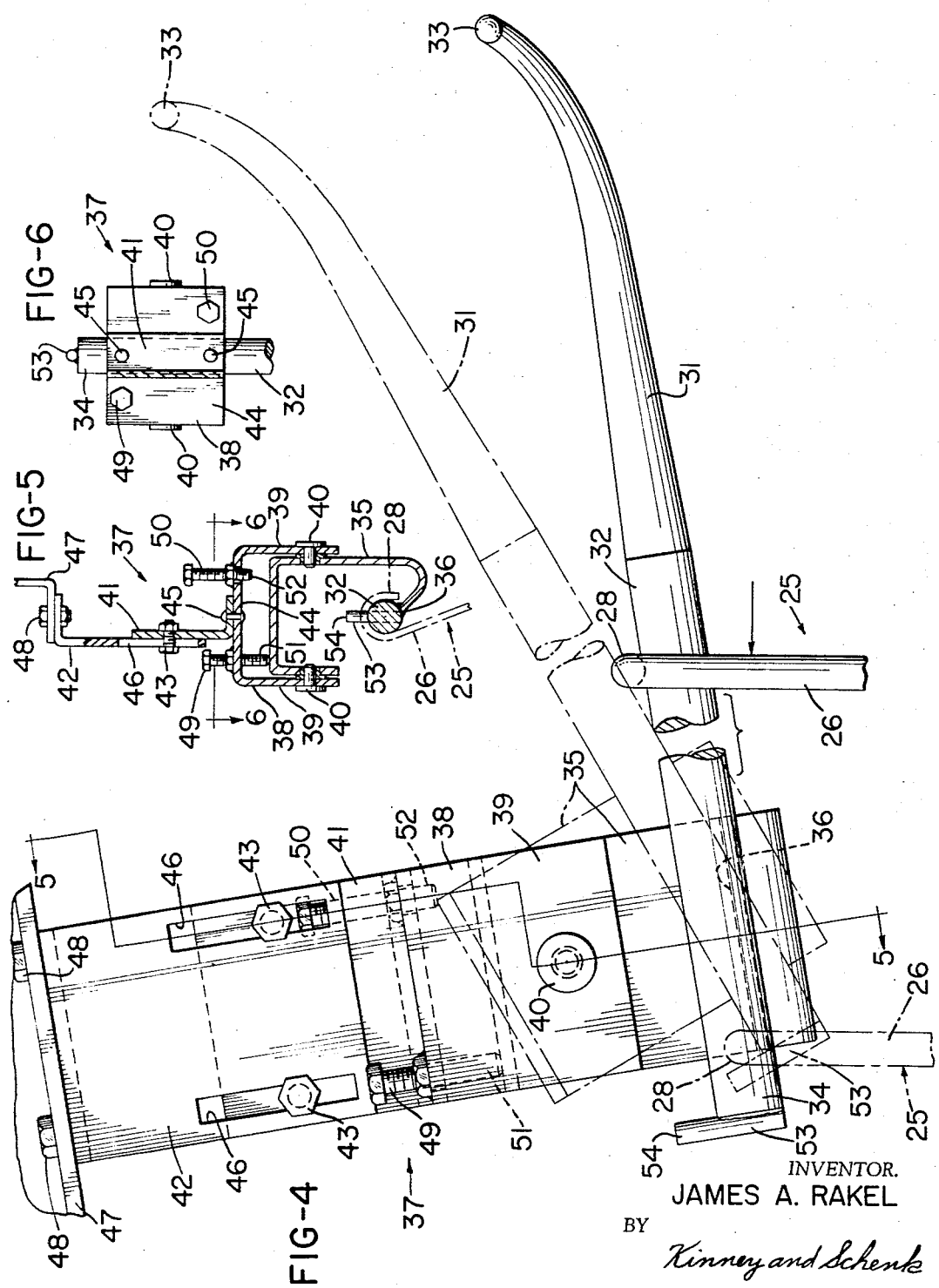
INVENTOR.
JAMES A. RAKEL
BY
Kinney and Schenk
HIS ATTORNEYS

United States Patent Office 3,343,648
Patented Sept. 26, 1967

3,343,648
CONVEYING MEANS AND METHOD
James A. Rakel, Cincinnati, Ohio, assignor to The National Marking Machine Co., Cincinnati, Ohio, a corporation of Ohio
Filed Oct. 22, 1965, Ser. No. 500,752
8 Claims. (Cl. 198—27)

ABSTRACT OF THE DISCLOSURE

This disclosure relates to an improved conveyor system and to improved methods for conveying products in such a system. The conveyor system is designed to convey products from one work station to another work station with automatic conveying means and includes a pick-off member which automatically removes the product from the conveyor at a particular station along the conveying line in such a manner that the pick-off member moves automatically out of its pick-off position and will not continue to pick off additional products until the products are removed therefrom, whereby the pick-off member will again automatically move to its pick-off station.

This invention relates to an improved conveyor system as well as to improved parts for such a system or the like and to improved methods of conveying products in such a system or the like.

It is well known that in many factories, plants, and the like desired products must be conveyed from various work stations to other work stations by automatic conveyor means whereby when the product is conveyed to a particular station, the product can be removed from the conveyor means to be operated on at the particular station and, thereafter, be replaced on the conveyor means to be conveyed to another station or the like.

In particular, it is desirable to have a conveyor system so constructed and so arranged that the same will automatically remove the product from the conveyor means at the desired station so that the time-consuming removal feature can be automatically performed with a minimum of effort and with a minimum of apparatus.

According to the teachings of this invention, such an improved conveyor means is provided wherein the conveyed product is adapted to be automatically removed at a particular station along the conveying line in a unique and simple manner.

In particular, this invention provides a conveyor system wherein a desired product is adapted to be attached to a conveying member that is detachably secured to a moving conveyor line. Pick-off means of this invention is so constructed and arranged and is disposed adjacent the conveyor line in such a manner that the same is adapted to automatically pick off the conveying member when the same advances to the pick-off member, the pick-off member releasing the conveying member from the conveyor line and causing the conveying member to be carried by the pick-off member.

In addition, this invention provides such a pick-off member which is adapted to automatically move out of its pick-off position when the pick-off member has been sufficiently loaded so that the same will not continue to pick off additional conveying means in the above manner until the pick-off member is unloaded whereby the pick-off member will again move into its pick-off position.

In particular, the pick-off member of this invention is so constructed and arranged that the same is pivotally mounted to a support means so that when the pick-off member is unloaded, the natural weight of the pick-off member will automatically position the pick-off end of the pick-off member in the proper position relative to the conveyor line to pick off a product conveying member when the same reaches the pick-off member, the pick-off member when loaded by the picked-off conveying member automatically pivoting out of its pick-off position by the weight of the pick-off conveying member whereby the pick-off member remains in its pivoted out of the way position until the same is unloaded.

Therefore, it is an object of this invention to provide an improved conveyor system having one or more of the novel features of this invention as set forth above or hereinafter shown or described.

Another object of this invention is to provide an improved pick-off member for such a conveyor system or the like.

A further object of this invention is to provide an improved method for conveying products or the like.

Other objects, uses and advantages of this invention are apparent from a reading of this description, which proceeds with reference to the accompanying drawings forming a part thereof and wherein:

FIGURE 1 is a schematic perspective view illustrating one embodiment of the conveyor system of this invention.

FIGURE 2 is a fragmentary perspective view illustrating the pick-off member of this invention in combination with the conveyor line of FIGURE 1.

FIGURE 3 is an end view of the structure illustrated in FIGURE 2 with the pick-off member of this invention releasing the conveying member from the conveyor line.

FIGURE 4 is a fragmentary side view illustrating the improved pick-off member of this invention with the pick-off member being shown in full lines in its pick-off position and in dotted lines in its pivoted and loaded position.

FIGURE 5 is a reduced cross-sectional view taken on line 5—5 of FIGURE 4.

FIGURE 6 is a fragmentary cross-sectional view taken on line 6—6 of FIGURE 5.

While the various features of this invention are hereinafter described and illustrated as being particularly adaptable for forming a conveyor system, it is to be understood that the various features of this invention can be utilized singly or in combination thereof to provide other systems as desired.

Therefore, this invention is not to be limited to only the embodiment illustrated in the drawings, because the drawings are merely utilized to illustrate one of the wide variety of uses of this invention.

Referring now to FIGURE 1, an improved conveyor system of this invention is generally indicated by the reference numeral 10 and comprises a continuously moving conveyor line 11 suitably suspended from supporting structure 12 of a plant or the like whereby desired products can be conveyed in an overhead manner through a suitable plant or the like and be conveyed from station to station thereof, each station being generally indicated by the reference numeral 13.

As illustrated in FIGURES 1–3, the conveyor line 11 comprises a substantially I-shaped beam means 14 sinuously disposed throughout the plant to direct the conveyed products in the desired path throughout the plant, the I-beam structure 14 receiving a plurality of trolley like members 15 supported on the I-beam structure 14 by a plurality of rollers 16 respectively disposed on opposite sides of the vertical flange or web 17 of the I-beam section 14 and rolling on the bottom transverse web 18 thereof.

The trolley like members 15 are adapted to be tied together by a cable-like member 19 whereby the trolley like members 15 move in unison along the track 14 by suitable power means pulling or pushing the tying means 19 in one general direction.

Each trolley like member 15 has a pair of opposed members 20 interconnected together by spacer means of pin-like members 21 attached thereto, the rollers 16 being attached to each member 20 of each trolley-like member 15.

In this manner, a hook like member 22 can be carried by each trolley like member 15 by having an upper hook-shaped end 23 thereof disposed over the pin-like member 21 in the manner illustrated in FIGURES 2 and 3 whereby the lower hook-shaped portion 24 of the hook-like member 22 hangs vertically downwardly from the trolley like member 15 for the purpose hereinafter described.

The conveying member of this invention is generally indicated by the reference numeral 25 throughout the figures of the drawings and comprises a first member 26 having a lower end 27 constructed in any desired manner to permit the same to be detachably secured to a desired product to be conveyed in the conveyor system 10, such attaching means not forming any part of this invention and can be formed in any desired manner. However, the other end 28 of the member 26 is provided with a hook-shape to provide a pick-off means for the particular conveying member 25 in a manner hereinafter described.

Another member 29 is secured to the member 26 of each conveying member 25 and has a hook-shaped portion 30 thereof disposed over the hook-shaped end 24 of the hook-member 22 of the respective trolley like member 15 in the manner illustrated in FIGURE 3.

Thus, it can be seen that when the particular conveying member 25 has its end 27 interconnected to a desired product in any desired manner, the conveyor member 25 can be attached to the conveyor line 11 by the hook-portion 30 thereof in the manner illustrated in FIGURE 2 whereby the particular conveying member 25 will be conveyed along the track 14 by the trolley like member 15 with the hook portion 28 thereof being disposed in the position illustrated in FIGURE 2 for a purpose now to be described.

As illustrated in FIGURES 2 and 3, a pick-off member 31 of this invention is provided and comprises a rod-like structure having a substantially straight portion 32, FIGURE 4, interconnected to a curved pick-off end 33 for a purpose hereinafter described, the pick-off end 33 being a substantially conical construction so that the same has a small tapering end portion for a purpose hereinafter described.

The pick-off member 31 is adapted to be located adjacent the conveyor line 11 at a particular station 13 to automatically remove a conveying member 25 from the line 11 in a manner hereinafter described.

As illustrated in FIGURES 4–6, the pick-off member 31 has a substantially circular cross-sectional configuration throughout its length from the pick-off end 33 thereof to the other opposed end 34 thereof, the pick-off member 31 either being solid or hollow and being formed of any suitable material, such as plastic, metal and the like.

A substantially C-shaped member 35 is provided and has one end 36 fastened to the pick-off member 31 in the manner illustrated in FIGURE 5 whereby the hook-portion 28 of a conveying member 25 can slide down the pick-off member 31 from the pick-off end 33 to the other end 34 for a purpose hereinafter described without interference from the C-shaped member 35.

The C-shaped member 35 is utilized to pivotally mount the pick-off member 31 to a support means 37, the support means 37 including a substantially inverted U-shaped member 38 telescopically receiving the upper portion of the C-shaped member 35 and having its legs 39 pivotally carrying the C-shaped member 35 by a pivot pin means 40. The support means 37 also includes two L-shaped members 41 and 42 adjustably interconnected together by bolt means 43.

In particular, the L-shaped member 41 is attached to the cross-member 44 of the U-shaped member 38 by fastening means 45 and carries the bolt means 43 in suitable apertures thereof. The other L-shaped member 42 has slot means 46 provided therein and receiving the bolt means 43 whereby upon loosening the bolt means 43, the L-shaped members 42 and 41 can be adjusted relative to each other within the limits of the slots 46 and, thereafter, be fixed in their selected and adjusted position by tightening the bolt means 43. The L-shaped member 42 is adapted to be rigidly attached to a supporting structure 47 by fastening means 48 whereby the support means 37 of this invention is adapted to be fixed relative to the conveying line 11 while pivotally carrying the pick-off member 31 for a purpose hereinafter described.

The cross-member 44 of the U-shaped member 38 of the support means 37 threadedly carries a pair of threaded adjusting members 49 and 50 respectively having ends 51 and 52 adjustable inwardly and outwardly relative to the C-shaped member 35 of the pick-off member 31 for a purpose hereinafter described.

The end 34 of the pick-off member 31 has a stop pin 53 secured thereto and provided with an upper end 54 extending above the end 34 of the pick-off member 31 for a purpose hereinafter described.

Therefore, it can be seen that the pick-off means of this invention is a relatively simple and inexpensive structure which operates in a unique and novel manner hereinafter described.

For example, the location of the pick-off member 31 relative to the conveying line 11 can be adjusted by adjusting the members 41 and 42 of the support means 37 relative to each other.

Thereafter, since the weight of the unloaded pick-off member 31 is so arranged relative to the pivot means 40 to cause the pick-off end 33 of the unloaded pick-off member 31 to automatically tend to pivot downwardly by the natural weight of the pick-off member 31, adjustment of the adjusting member 49 relative to the support means 37 will so position the end 51 of the adjusting member 49 that the pick-off position of the pick-off member 31 can be selected because the C-shaped member 35 will abut against the end 51 of the adjusting member 39 to hold the pick-off member 31 in its selected pick-off position.

Similarly, the other adjusting member 50 can be adjusted relative to the support means 37 to position the end 52 thereof in the desired position relative to the C-shaped member 35 so that when the pick-off member 31 is pivoted in a counterclockwise direction relative to the support means 37 in a manner hereinafter described, the maximum pivotal movement of the pick-off member 31 in a counterclockwise direction from its pick-off position will be limited by the C-shaped member 35 abutting against the end 52 of the adjusting member 50.

The operation of the pick-off member 31 in the system 10 of this invention will now be described.

With the unloaded pick-off member 31 in the full line pick-off position at FIGURE 4, the pick-off end 33 of the pick-off member 31 is so positioned relative to the conveying line 11 that when a trolley 15 is advanced toward the station 13 having the pick-off member 31 with the trolley 15 carrying a product-conveying member 25 in the manner illustrated in FIGURE 2, it can be seen that the hook-portion 28 of the conveying member 25 becomes aligned with the pick-off end 33 of the pick-off member 31. As the hook-portion 28 of the conveying member 25 telescopes onto the pick-off end 33 of the pick-off member 31 in the manner illustrated in FIGURE 3, the curved pick-off end 33 of the pick-off member 31 causes the conveying member 25 to move along the pick-off member 31 in such a manner that the hook portion 30 of the conveying member 25 becomes detached from the hook 24 of the moving and descending trolley 15 in the manner illustrated in FIGURE 3 whereby the product conveying member 25 is now carried by the pick-off member 31 and is completely detached from the conveying line 11.

Because the pick-off member 31 is angularly disposed relative to the horizontal in the manner illustrated in FIGURE 4 with the pick-off end 33 raised or elevated relative to the end 34 thereof, the picked-off conveying member 25 slides down the pick-off member 31 from the pick-off end 33 thereof to the end 34 in the manner illustrated in FIGURE 4.

When the sliding picked-off conveying member 25 reaches the end 34 of the pick-off member 31, the sliding movement of the conveying member 25 is arrested by the end 54 of the pin 53 in the manner illustrated by dotted lines in FIGURE 4 whereby the weight of the product conveying member 25 in the dotted line position of FIGURE 4 is such that the same causes the pick-off member 31 to pivot from the full line illustrated in FIGURE 4 to the dotted line position illustrated in FIGURE 4 whereby the C-shaped member 35 is disposed against the end 52 of the adjusting member 50. With the loaded pick-off member 31 now disposed in the dotted line position of FIGURE 4, it can be seen that the pick-off end 33 of the pick-off member 31 has now been moved out of a pick-off position relative to the conveyor line 11 whereby the loaded pick-off member 31 will not pick off any additional conveying members 25 being moved by the line 11.

However, when the operator desires to utilize the picked-off conveying member 25 on the pick-off member 31 of this invention, the operator lifts the hook-portion 28 of the picked-off conveying member 25 from the pick-off member 31 whereby the now unloaded pick-off member 31 will automatically pivot back from the dotted line position illustrated in FIGURE 4 to the full line position illustrated in FIGURE 4 through the natural weight of the unloaded pick-off member 31 whereby the C-shaped member 35 is now disposed against the end 51 of the adjusting member 49 so that the pick-off end 33 of the pick-off member 31 is now in its pick-off position to pick off another conveying member 25 in the manner previously described.

While the pick-off means 31 of this invention has been previously described as being automatically moved to its out of the way position when the pick-off member 31 picks off just one conveying member 25 in the manner previously described, it is to be understood that the pick-off member 31 and support means 37 of this invention can be so constructed and arranged that the same will require several pick-off conveying means 25 to be disposed at the end 34 of the pick-off member 31 before the pick-off member 31 will automatically move from its pick-off position to its out of the way position in the manner previously described.

In view of the above, it can be seen that this invention provides an improved conveyor system for conveying desired products from station to station wherein the desired product can be automatically removed at a desired station by the improved pick-off member of this invention, the pick-off member of this invention being so constructed and arranged that when the same has been loaded to a particular degree by picked-off product means, the pick-off member will automatically move to an out of the way position so that the same cannot pick off additional product means from the conveyor line until the pick-off member has been unloaded, the unloaded pick-off member automatically moving to its pick-off position.

Therefore, not only does this invention provide an improved conveyor system which is relatively inexpensive to manufacture and operate, but also this invention provides an improved pick-off member for such a conveyor system as well as improved methods for conveying products or the like.

While the form of the invention now preferred has been disclosed as required by statute, other forms may be used, all coming within the scope of the claimed subject matter which follows.

What is claimed is:

1. In combination, a support means, and a pick-off member pivoted to said support means intermediate the opposed ends of said pick-off member, said pick-off member being pivoted to a pick-off position when unloaded to pick-off a product-conveying member by the natural weight of said pick-off member, said pick-off member being pivoted to an out of the way position when the pick-off conveying member is loaded against the other end of said pick-off member by the weight of said product-conveying member, said pick-off member is disposed at an angle relative to the horizontal in its pick-off position with said one end elevated above said other end whereby said pick-off conveying member slides by gravity from said one end to said other end.

2. A combination as set forth in claim 1 wherein said one end is pointed and curved.

3. In a method for conveying a product by a conveying member detachably carried by a moving conveyor line, the improved method steps of picking off said product-conveying member with a pick-off member, and pivoting said pick-off member to an out of the way position by the weight of said picked off conveying member until said pick-off member is unloaded and is pivoted back to its pick-off position by the natural weight of said unloaded pick-off member.

4. In a method as set forth in claim 3, the additional step of adjusting the pick-off pivotal position of said pick-off member.

5. In a method as set forth in claim 3, the additional step of adjusting the out of the way pivotal position of said pick-off member.

6. In a conveyor system having a moving conveyor line detachably carrying a product conveying member having pick-off means, the improvement comprising support means, a pick-off member disposed adjacent said conveyor line and pivotally mounted to said support means, said pick-off member having means to receive said pick-off means of said conveying member and cause said conveying member to be released from said conveyor line and load said pick-off member, said pick-off member pivoting out of its pick-off position when loaded and pivoting into its pick-off position when unloaded, said pick-off member being pivotally mounted to said support means intermediate the opposed ends of said pick-off member, said pick-off member when in its pick-off position having one end elevated relative to the other end to receive said pick-off means of said conveying member and convey said picked-off conveying member down said pick-off member to the other end thereof whereby said loaded pick-off member pivots relative to said support means to elevate said one end of said pick-off member above its pick-off position.

7. In a system as set forth in claim 6, said pick-off member and support means having means to preset said pick-off position of said one end of said pick-off member.

8. In a system as set forth in claim 6, said pick-off member and support means having means to preset the position to which said pick-off member is pivoted when loaded.

References Cited
UNITED STATES PATENTS

| | | | |
|---|---|---|---|
| 1,503,936 | 8/1924 | Benoit | 198—38 |
| 1,664,393 | 4/1928 | Bixler et al. | 198—38 |
| 3,231,072 | 1/1966 | Ohrnell | 198—38 X |

EVON C. BLUNK, *Primary Examiner.*

R. J. HICKEY, *Assistant Examiner.*